(12) United States Patent
Kaneko et al.

(10) Patent No.: US 7,889,388 B2
(45) Date of Patent: Feb. 15, 2011

(54) IMAGE FORMING APPARATUS AND IMAGE PROCESSING METHOD

(75) Inventors: Hidemi Kaneko, Kanagawa (JP); Hiroyoshi Uejo, Kanagawa (JP); Takeshi Furuyama, Kanagawa (JP); Kenji Ueda, Kanagawa (JP); Shinji Hanaoka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 928 days.

(21) Appl. No.: 11/645,675

(22) Filed: Dec. 27, 2006

(65) Prior Publication Data

US 2007/0211277 A1  Sep. 13, 2007

(30) Foreign Application Priority Data

Mar. 7, 2006  (JP) ............................. 2006-060548

(51) Int. Cl.
  *G06F 15/00*  (2006.01)
  *G06F 3/08*   (2006.01)
  *G06K 6/00*   (2006.01)

(52) U.S. Cl. .................... 358/1.9; 358/518; 358/3.13; 347/254

(58) Field of Classification Search .............. 358/1.9, 358/504, 518, 3.06, 3.13; 399/27; 347/131, 347/254
See application file for complete search history.

(56) References Cited

U.S. PATENT DOCUMENTS

| | | | | |
|---|---|---|---|---|
| 5,646,670 A * | 7/1997 | Seto et al. | | 347/131 |
| 6,313,925 B1 * | 11/2001 | Decker et al. | | 358/1.9 |
| 6,816,179 B2 * | 11/2004 | Hanyu | | 358/1.9 |
| 7,133,154 B2 | 11/2006 | Sugiyama | | 358/1.9 |
| 7,274,490 B2 * | 9/2007 | Sasanuma | | 358/1.9 |
| 7,433,100 B2 * | 10/2008 | Jacob | | 358/518 |
| 2003/0047099 A1 * | 3/2003 | Hanyu | | 101/484 |
| 2003/0156120 A1 * | 8/2003 | Sasanuma | | 345/600 |
| 2004/0223174 A1 * | 11/2004 | Mikami | | 358/1.9 |
| 2005/0024661 A1 * | 2/2005 | Akashi | | 358/1.9 |
| 2007/0030500 A1 * | 2/2007 | Otake et al. | | 358/1.9 |
| 2007/0153308 A1 * | 7/2007 | Zemach et al. | | 358/1.9 |
| 2007/0292156 A1 * | 12/2007 | Eguchi | | 399/74 |
| 2008/0100871 A1 * | 5/2008 | Iida | | 358/1.9 |
| 2009/0290883 A1 * | 11/2009 | Nakahara | | 399/27 |

FOREIGN PATENT DOCUMENTS

| | | |
|---|---|---|
| JP | A-09-325653 | 12/1997 |
| JP | 2001-034118 | 2/2001 |
| JP | 2002-290761 | 10/2002 |
| JP | A-2003-143423 | 5/2003 |
| JP | 2005-020413 | 1/2005 |
| JP | 2005-055483 | 3/2005 |
| JP | 2005-234391 | 9/2005 |

* cited by examiner

*Primary Examiner*—Kimberly A Williams
(74) *Attorney, Agent, or Firm*—Morgan, Lewis & Bockius LLP

(57) ABSTRACT

An image forming apparatus with a saving mode in which imaging materials to be used are reduced, includes: an image processing part that converts image data from which an image will be formed into corresponding image data in an output color space; and an image forming part that forms the image from the image data converted by the image processing part, using the imaging materials, the image processing part reducing a color component of non-dominant (n+m)-component color mixed into a dominant n-component color in the image data converted, where n and m are integers of 1 or greater.

15 Claims, 10 Drawing Sheets

FIG. 5

LaB DATA

| L* | a* | b* |
|---|---|---|
| 61 | 40 | -60 |
| 61 | 40 | -50 |
| 61 | 40 | -40 |
| 61 | 40 | -30 |
| 61 | 40 | -20 |
| 61 | 40 | -10 |
| 61 | 40 | 0 |
| 61 | 40 | 10 |
| 61 | 40 | 20 |
| 61 | 40 | 30 |
| 61 | 40 | 40 |
| 61 | 40 | 50 |
| 61 | 40 | 60 |
| 61 | 40 | 70 |
| 61 | 40 | 80 |
| 61 | 40 | 90 |
| 61 | 40 | 100 |

↓ COLOR SPACE CONVERSION

YMCK DATA I

| Y | M | C | K | TOTAL TONER AMOUNT |
|---|---|---|---|---|
| 0 | 61.719 | 39.844 | 0 | 101.563 |
| 0 | 62.5 | 34.766 | 0 | 97.266 |
| 0 | 62.5 | 29.688 | 0 | 92.188 |
| 0 | 63.281 | 23.828 | 0 | 87.109 |
| 0 | 63.672 | 18.359 | 0 | 82.031 |
| 3.906 | 63.672 | 11.328 | 2.866 | 81.772 |
| 19.531 | 66.016 | 5.859 | 3.405 | 94.811 |
| 33.984 | 67.578 | 4.688 | 2.373 | 108.623 |
| 48.438 | 69.531 | 3.906 | 1.217 | 123.092 |
| 62.5 | 70.703 | 3.516 | 0.295 | 137.014 |
| 75 | 71.094 | 2.734 | 0.068 | 148.896 |
| 86.328 | 71.094 | 1.953 | 0 | 159.375 |
| 97.266 | 70.703 | 1.562 | 0 | 169.531 |
| 100 | 69.141 | 0 | 0 | 169.141 |
| 100 | 66.016 | 0 | 0 | 166.016 |
| 100 | 63.281 | 0 | 0 | 163.281 |
| 100 | 59.766 | 0 | 0 | 159.766 |

↓ TONER REDUCTION

YMCK DATA II

| Y | M | C | K | TOTAL TONER AMOUNT |
|---|---|---|---|---|
| 0 | 61.719 | 39.844 | 0 | 101.563 |
| 0 | 62.5 | 34.766 | 0 | 97.266 |
| 0 | 62.5 | 29.688 | 0 | 92.188 |
| 0 | 63.281 | 23.828 | 0 | 87.109 |
| 0 | 63.672 | 18.359 | 0 | 82.031 |
| 0.7812 | 63.672 | 7.554 | 0 | 72.0052 |
| 0.7812 | 66.016 | 2.9795 | 0.6881 | 89.1575 |
| 1.172 | 67.578 | 1.172 | 32.812 | 102.734 |
| 0.7812 | 69.531 | 0.7812 | 47.656 | 118.7502 |
| 0.7812 | 70.703 | 0.7032 | 61.719 | 133.9062 |
| 75 | 71.094 | 0 | 0 | 146.094 |
| 86.328 | 71.094 | 0 | 0 | 157.422 |
| 97.266 | 70.703 | 0 | 0 | 167.969 |
| 100 | 69.141 | 0 | 0 | 169.141 |
| 100 | 66.016 | 0 | 0 | 166.016 |
| 100 | 63.281 | 0 | 0 | 163.281 |
| 100 | 59.766 | 0 | 0 | 159.766 |

REDUCTION IN TONER AMOUNT

IMAGE FORMING APPARATUS AND IMAGE PROCESSING METHOD

CROSS-REFERENCE TO RELATED APPLICATIONS

This application is based on and claims priority under 35 USC 119 from Japanese Patent Application No. 2006-060548 filed Mar. 7, 2006.

BACKGROUND

1. Technical Field

The present invention relates to image forming apparatus and an image processing method and, more particularly, an image forming apparatus adapted to save imaging materials.

2. Related Art

Recently, there is quite a high demand for reducing the amount of consumption of imaging materials such as toners and inks which are used in various types of image forming equipment. For example, for image processing equipment using toners, the amount of consumption of the toners has typically been reduced by sparsifying or quantizing pixels of an image to be drawn on a recording medium.

A technique that removes very small amounts of color components mixed in an output color and produces a high quality image output has also been proposed.

SUMMARY

According to an aspect of the invention, an image forming apparatus with a saving mode in which imaging materials to be used are reduced, includes: an image processing part that converts image data from which an image will be formed into corresponding image data in an output color space; and an image forming part that forms the image from the image data converted by the image processing part, using the imaging materials, the image processing part reducing a color component of non-dominant (n+m)-component color mixed into a dominant n-component color in the image data converted, where n and m are integers of 1 or greater.

BRIEF DESCRIPTION OF THE DRAWINGS

Exemplary embodiments of the present invention will be described in detail based on the following figures, wherein:

FIG. 5 shows a table to explain color conversion according to the conversion LUT;

DETAILED DESCRIPTION

Exemplary embodiments of the present invention will now be described hereinafter with reference to the accompanying drawings.

First Exemplary Embodiment

Figure 1:
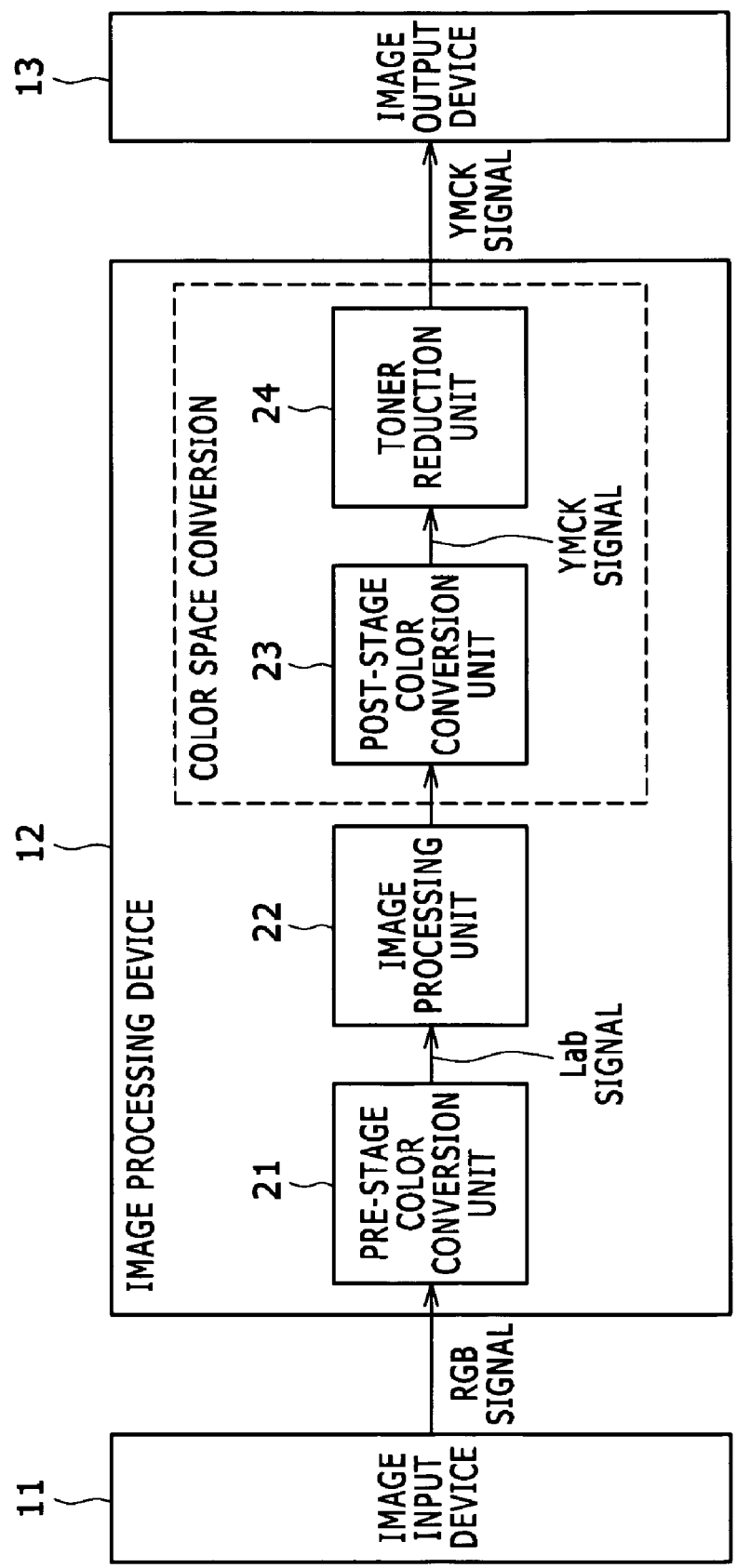
FIG. 1 is a bock diagram showing a configuration of an image forming apparatus to which an exemplary embodiment of the invention is applied.

FIG. 1 is a block diagram showing a configuration of an image forming apparatus to which a first exemplary embodiment of the invention is applied. The image forming apparatus shown in FIG. 1 is configured, including an image input device 11, an image processing device 12, and an image output device 13. The image input device 11 scans a document and outputs image data represented in an RGB color space. The image processing device 12 processes the image data input from the image input device 11 for various purposes and outputs converted image data in an YMCK color space to the image output device 13. The image output device 13 forms an image on paper from the image data input from the image processing device 12, using an imaging material such as toners.

In the image forming apparatus shown in FIG. 1, toner reduction to save the imaging material is performed within the image processing device 12. The image processing device 12 includes a pre-stage color conversion unit 21 that converts the color space for image data input from the image input device 11 from RGB to L*a*b* (hereinafter abbreviated to "Lab"). The image processing device 12 also includes an image processing unit 22 that performs processing for various purposes such as correction, scaling or compression, etc. on the image data represented in the Lab color space. The image processing device 12 further includes a post-stage color conversion unit 23 that converts the image data represented in the Lab color space into the image data represented in the YMCK color space. The image processing device 12 still further includes a toner reduction unit 24 that cuts the amount of redundant toners by removing non-dominant two-component (or additionally, three-component or four-component) colors. The post-stage color conversion unit 23 and the toner reduction unit 24 can be construed as being combined into a single-component color conversion entity. That is, the image processing can be adapted to directly convert the Lab data into the YMCK data modified to reduce some toners. In such case, it is needed to embed the toner reduction function into color conversion parameters beforehand (this will be described later).

In the present exemplary embodiment, when a toner saving function is selected, such as when toner save setting is on, as specified by a user via a user interface (UI) screen as will be described later, a reduction in the imaging material (toner reduction) is performed. More specifically, at the conversion to the output color space (YMCK) from the input color space (RGB or Lab), for pixels in an area represented by a single-component color or dominant two-component (or three-component) colors, the color conversion is performed so as to prevent additional colors from mingling with the dominant color or colors (that is, to remove non-dominant colors). Thereby, it is possible to print with a less amount of toners than the amount of toners used in the conventional print process. For example, for the image forming apparatus that outputs an image represented in the YMCK color space, Y, M, C, and K color components are expressed by dominant single-component colors and R, G, and B color components are expressed by dominant two-component colors. When an image is represented by using these dominant n-component colors (where n is an integer of 1 or greater), non-dominant (n+m)-component colors (where n and m are integers of 1 or greater) may be mixed into the color image representation. In the present exemplary embodiment, the color conversion is performed to reduce the non-dominant (n+m)-component colors (where n and m are integers of 1 or greater) to (0 or approximating to 0). In the color space such as YMCK, a color represented by using two colors is a two-component color, a color represented by using three colors is a three-component color, and a color represented by using four colors is a four-component color. If other colorants in addition to the YMCK are used to represent a color image, five-component or six-component colors are possible to exist.

Figure 2:
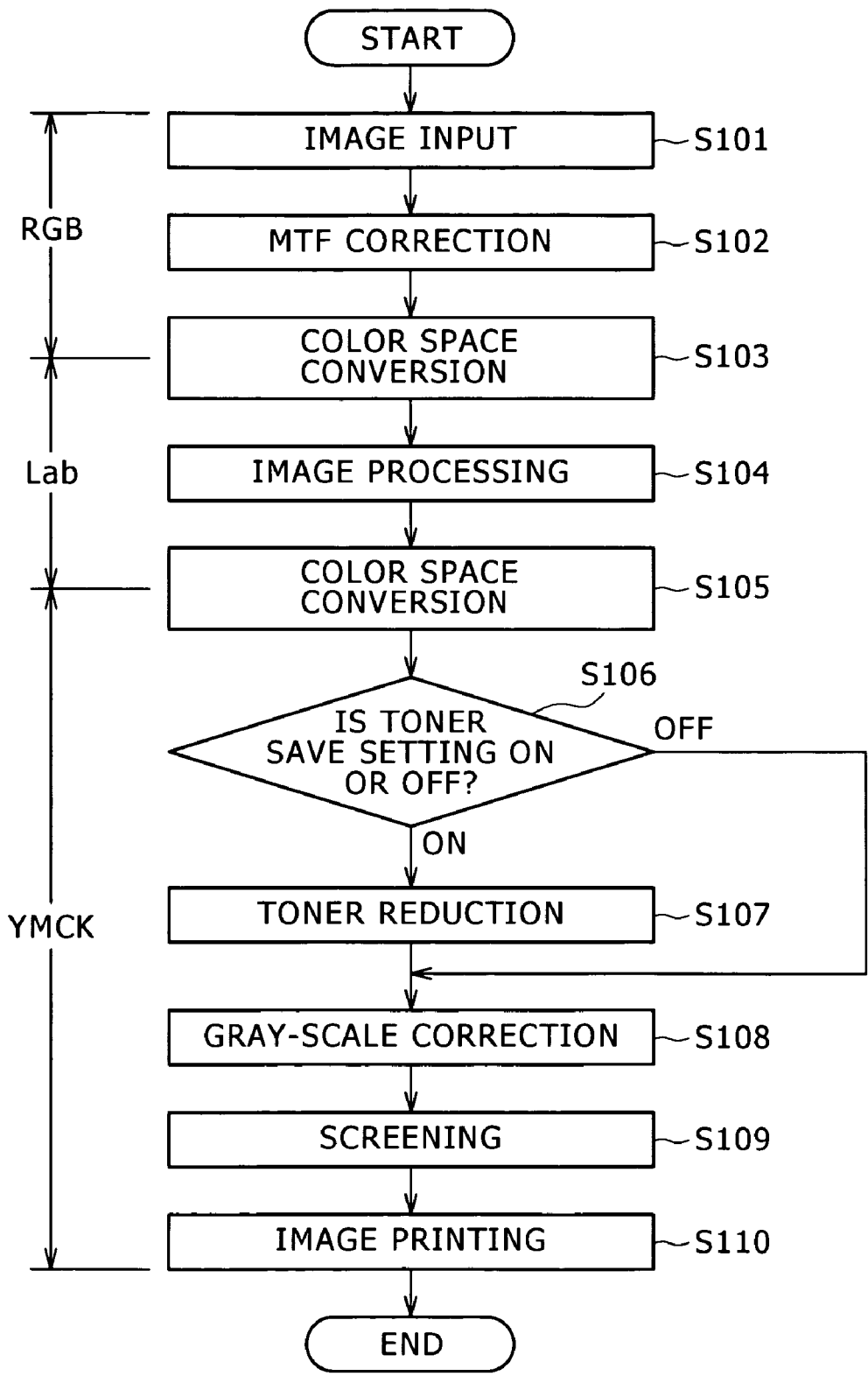
FIG. 2 is a flowchart illustrating a process flow that is performed by the image forming apparatus shown in FIG. 1.

FIG. 2 is a flowchart illustrating a process flow that is performed by the image forming apparatus shown in FIG. 1. This flowchart describes the process flow in relation to the color spaces. First, the image input device 11 scans an image and the image (image data, image signals) represented in, for example, the RGB color space is input (step 101). The input image data is subjected to MTF correction which is made by, for example, the image input device 11, using, for example, an emphasizing filter (step 102). Then, the pre-stage color conversion unit 21 in the image processing device 21 executes color space conversion from the RGB color space to the YMCK color space data (step 103).

The image data converted into Lab signals in the uniform color space is processed by the image processing unit 22 for various purposes such as correction and scaling. (step 104). Then, the post-stage color conversion unit 23 executes color space conversion from the Lab color space to the YMCK color space which is output color space (step 105). Here, the image processing device 12 determines whether toner save setting is on or off, as specified via, for example, the UI screen (step 106). This setting may be set on or off automatically by a function internal to the apparatus. If the toner save setting is on, toner reduction is performed at step 107 (step 107). If the toner save setting is off, step 108 and subsequent steps are executed without executing the step 107.

In the process of step 108 and subsequent steps, the YMCK image data is subjected to gray-scale correction (step 108) and screening (step 109), which are executed by, for example, the controller of the image output device 13. After these steps, the image output device 13 prints the image by, for example, electrophotographic printing using Y color, M color, C color, and K color toners (step 110), and the process terminates.

Here, the toner reduction operation at step 107 which is a specific feature of the present exemplary embodiment is explained.

Figure 3:
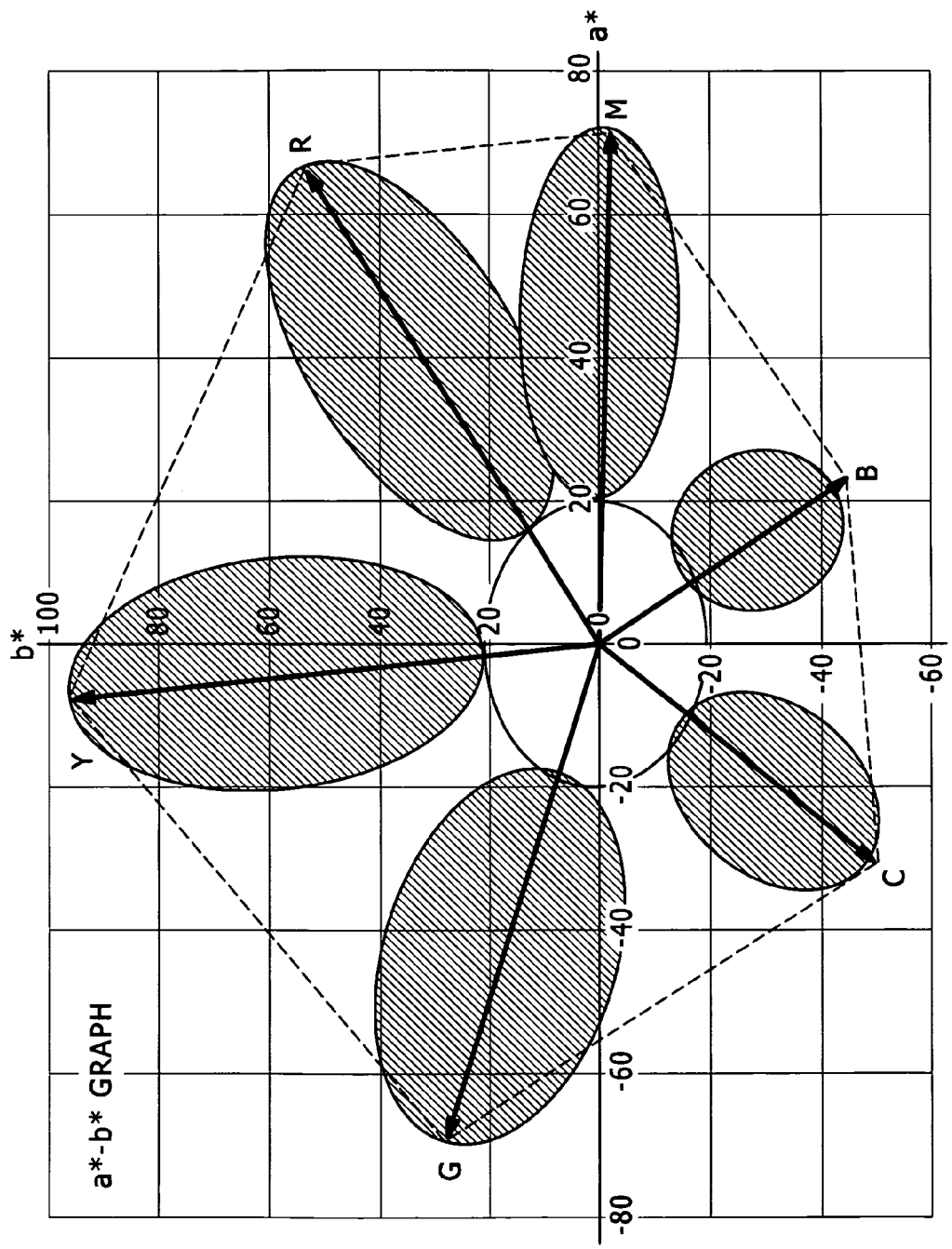
FIG. 3 is a graph to explain the areas for which color conversion is performed.

FIG. 3 is a graph to explain the areas for which color conversion is performed, with a* on the abscissa and b* on the ordinate. In the a*–b* graph shown here, the RGB color axes and the CMY color axes are expressed. The RGB color space which is output from the image input device 11 is a format of color representation by so-called additive color mixing in which color change from black to white is made by color addition and a mixture of the three primary colors "read, green, and blue" in equal proportions produces a brightest white color. On the other hand, in the YMCK color space which is input to the image output device 13, subtractive color mixing which is inverse to the additive color mixing takes place. In the subtractive color mixing, a mixture of "cyan, magenta, and yellow" colors in equal proportions produces a black and colors are represented by using a combination of the inks of the above-mentioned colors. In this YMCK color space, in contrast with the Y, M, C, and K single-component colors, two-component colors such as R, G, and B are produced by mixing two of the four Y, M, C, and K colors. For example, R (red) is produced by mixing dominant Y and M colors, G (green) is produced by mixing dominant Y and C colors, and B (blue) is produced by dominant C and M colors.

While a color is thus produced by a mixture of some colors among Y, M, C, and K, very small amounts of other color toners may mingle with a single-component color or two-component colors in producing a color, even for a color that can be represented by a single-component color or a two-component color. For example, a two-component or three-component color mingles with a color that can be represented by a single-component color and a three-component color mingles with a color that can be represented by a two-component color. In the present exemplary embodiment, the small amounts of additional colors are cut as follows: when a pixel is input, if the pixel has a very high proportion (higher than a given level) of a single-component color (or two-component color) in the output color space (in this case, YMCK), that is, the color is "dominant", even if other colors of very small amounts (lower than a given level) are included, that is, the other colors are "non-dominant", normal output values of the other colors are reduced. That is, uninfluential colors are cut. Thereby, other color components mingling with a single-component color (or two-component color) can be removed (reduced). Thereby, the total toner amount can be reduced without an extensive degradation of image quality and clearer color image quality can be obtained.

More specifically, in the Lab color space as shown in FIG. 3, in dilute color spaces around each color axis (R, G, B, C, M, and Y), color components mingled with each color after the conversion to the output color space (YMCK) are reduced. This is equivalent to defining the areas closer to each color axis of R, G, B. C, M, and Y. In effect, a determination is made as to whether an area shaded in FIG. 3 should be trimmed (including a two-component (three-component, four-component) color in a single-component color). If the area should be trimmed, trimming in accordance with a conversion Look Up Table (LUT) like the one which is shown in FIG. 4 is performed to remove (reduce) other color components mingled with the color.

Figure 4:
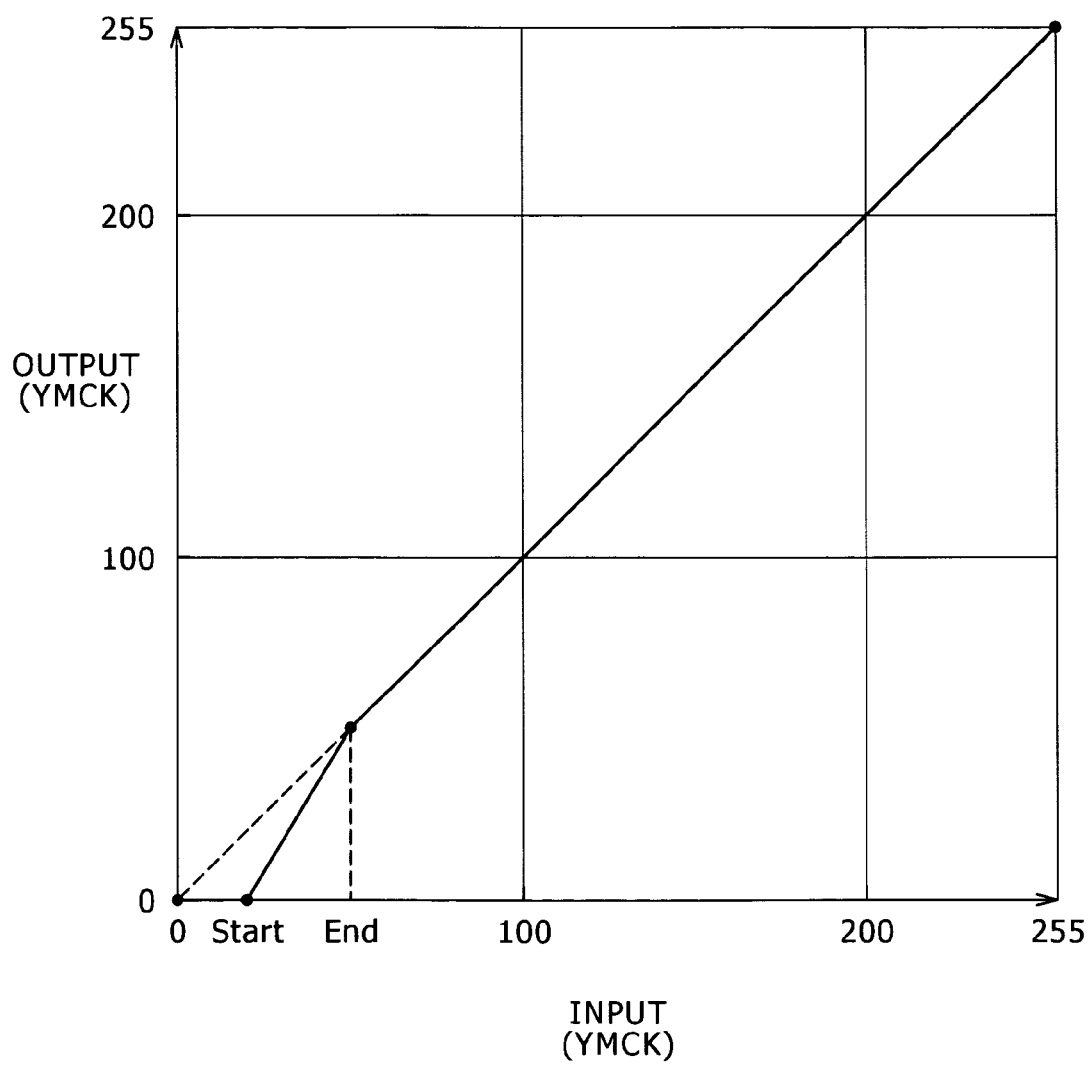
FIG. 4 shows a conversion LUT which is used by a toner reduction unit.

The conversion LUT shown in FIG. 4 is used by the toner reduction unit 24 shown in FIG. 1. Input values in terms of the amount of each color component of YMCK are plotted on the abscissa. Output values in terms of each color component after toner reduction is performed are plotted on the ordinate. A relationship between the input and output values is shown by a solid line graph. In the example shown in FIG. 4, the output values for each color component are set to 0 in a low gray-scale range (from 0 to "Start") to remove the color components mingled with the color. In the portion from "Start" to "End", the color components mixed with the color are reduced at a given ratio.

FIG. 5 is a table to explain color conversion according to the conversion LUT shown in FIG. 4. Color space conversion from Lab data to YMCK data I shown in FIG. 5 is performed by the post-stage color conversion unit 23 shown in FIG. 1. Toner reduction from the amounts of the toners for each color in YMCK data I to those in YMCK data II, as shown in FIG. 5, is derived in the toner reduction unit 24 by reference to the toner reduction LUT representing the characteristic shown in FIG. 4. Here, after the conversion from Lab data to YMCK data I, toner reduction (trimming in accordance with the toner reduction LUT) is performed to reduce the amount of redundant toners. In FIG. 5, in YMCK data II altered from YMCK data I, the fields highlighted by a black background have an output value of 0, which is defined so in the range from 0 to "Start" in the LUT of FIG. 4 in toner reduction. The shaded fields have a reduced output value, according to the reduction defined from "Start" to "End" in the LUT of FIG. 4. In the example shown in FIG. 5, input values less than 3 are converted to 0. For example, a cyan (C) input value of 11.328 is converted to 7.552 and the associated total toner amount of YMCK is reduced from 81.772 to 72.0052. In this way, the total toner amount for YMCK data II in the portion surrounded by a solid frame in FIG. 5 can be reduced as compared with the corresponding amount in normal mode shown in YMCK data I.

While, in the example shown in FIG. 5, conversion is performed in order of Lab data→YMCK data I→YMCK data II to make the process easy to understand, it is also possible to make color conversion from Lab data to YMCK data II without conversion to YMCK data I. In that case, it is needed to embed the toner reduction function into color conversion parameters beforehand.

As described above, after transition to the toner saving mode, for example, upon recognition of user selection of the toner saving function which is specified, for example, via the UI screen, the apparatus can apply an image processing method detailed below:

(1) First, a single-component color conversion is performed to cut a non-dominant two-component (three-component or four-component) color mixed into a single-component color, thereby reducing color components mingled with the single-component color;

(2) Two-component color conversion is performed to cut a non-dominant three-component (four-component) color mixed into the dominant two-component color, thereby reducing color components mingled with the two-component color; and (3) Three-component color conversion is performed to cut a non-dominant four-component color mixed into the dominant three-component color, thereby reducing color components mingled with the three-component color.

The operation in the above (1) to (3) is generalized to reducing color components of non-dominant (n+m)-component colors (where n and m are integers of 1 or greater) mixed into dominant n-component colors (where n is an integer of 1 or greater) in the image data converted. As the result of the reduction, colorants can be reduced. If at least one specific color is converted to 0, a color produced by the colorants for N colors (where N is an integer of 2 or greater) can be represented by the colorant(s) for at least one color or (N−1) colors. By the above-method, an image with less mixed colors is generated with a reduced amount of toners.

In realizing this image processing method, color conversion parameters are changed when the toner saving function is selected. Thereby, it is possible to reduce the total toner amount as compared with the toner saving techniques of related art, while maintaining image quality and, at the same time, it is possible to obtain clearer color image quality.

Furthermore, as an application of the present exemplary embodiment, it is also possible to obtain color conversion parameters adaptive for the colors of colorants specific to an engine (image output device) of the image forming apparatus. Different types of engines often use different colorants and there is a large difference in color appearance due to the colors of the colorants used. It is possible to perform precise color conversion optimum for the engine of the image forming apparatus. That is, higher-performance color conversion can be carried out by effective color conversion for making full use of the properties (hue angle, density, etc.) of the toners in use.

Furthermore, in the present exemplary embodiment, the toner reduction amount (level) can be controlled by adjusting the characteristic curve gradient (parameters) of the LUT that is used by the toner reduction unit 24.

Instead of using the LUT shown in FIG. 4, by assigning input values to an equation such as y=ax+b, output values can be calculated mathematically.

Moreover, in the exemplary embodiment described above, the toner reduction operation is executed in conjunction with color conversion from the Lab color space to the YMCK color space; however, it is not so limited. The toner reduction operation may be executed in conjunction with color conversion from the RGB color space directly to the YMCK color space.

Second Exemplary Embodiment

In the first exemplary embodiment, the toner reduction operation is executed in conjunction with color conversion according to the LUT. In the second exemplary embodiment, by making a chroma correction on, for example, Lab signals before the conversion to the YMCK color space according to the LUT, a greater reduction in the toner amount, particularly in color toners is achieved.

The same functions as those in the first exemplary embodiment are assigned the same reference numbers and their detailed descriptions are not repeated.

Figure 6:
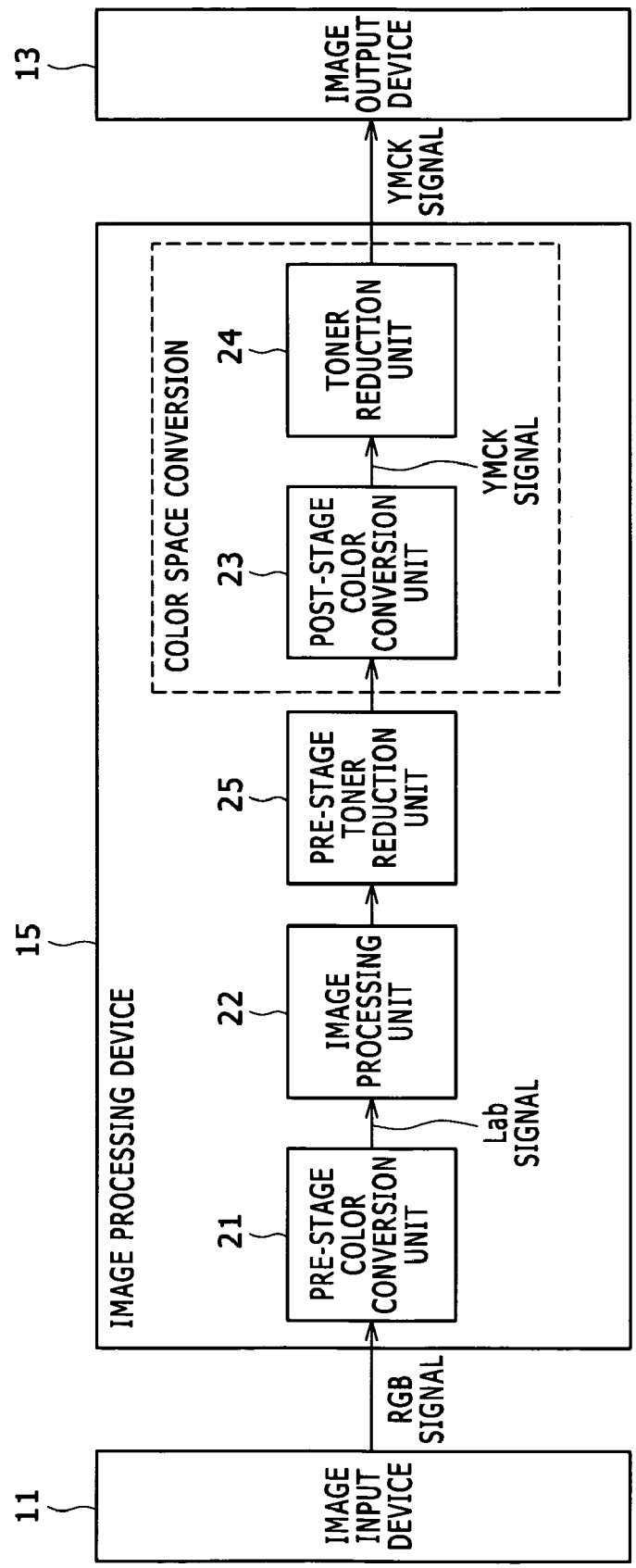
FIG. 6 is a block diagram showing a configuration of an image forming apparatus to which a second exemplary embodiment of the invention is applied.

FIG. 6 is a block diagram showing a configuration of an image forming apparatus to which the second exemplary embodiment is applied. The image forming apparatus shown in FIG. 6 employs an image processing device 15 instead of the image processing device 12 shown in FIG. 1. In the image processing device 15, a pre-stage toner reduction unit 25 is placed between an image processing unit 22 and a post-stage color conversion unit 23. The pre-stage toner reduction unit 25 makes the Lab signals in the uniform color space closer to the gray axis. That is, for an area to be printed by a three-color gray or the like in the vicinity of the L axis, a gray value is converted to a single-component color K (black) by the pre-stage toner reduction unit 25 within the predetermined bounds of basic chroma values (bounds at a predetermined level around the gray axis). This enables printing with less amount of toners than the amount of toners used in the conventional print process. In addition to the pre-stage toner reduction unit 25, the toner reduction unit 24 executes toner reduction, as described in the first exemplary embodiment; in this manner, a greater quantity of toner reduction can be expected.

Figure 7:
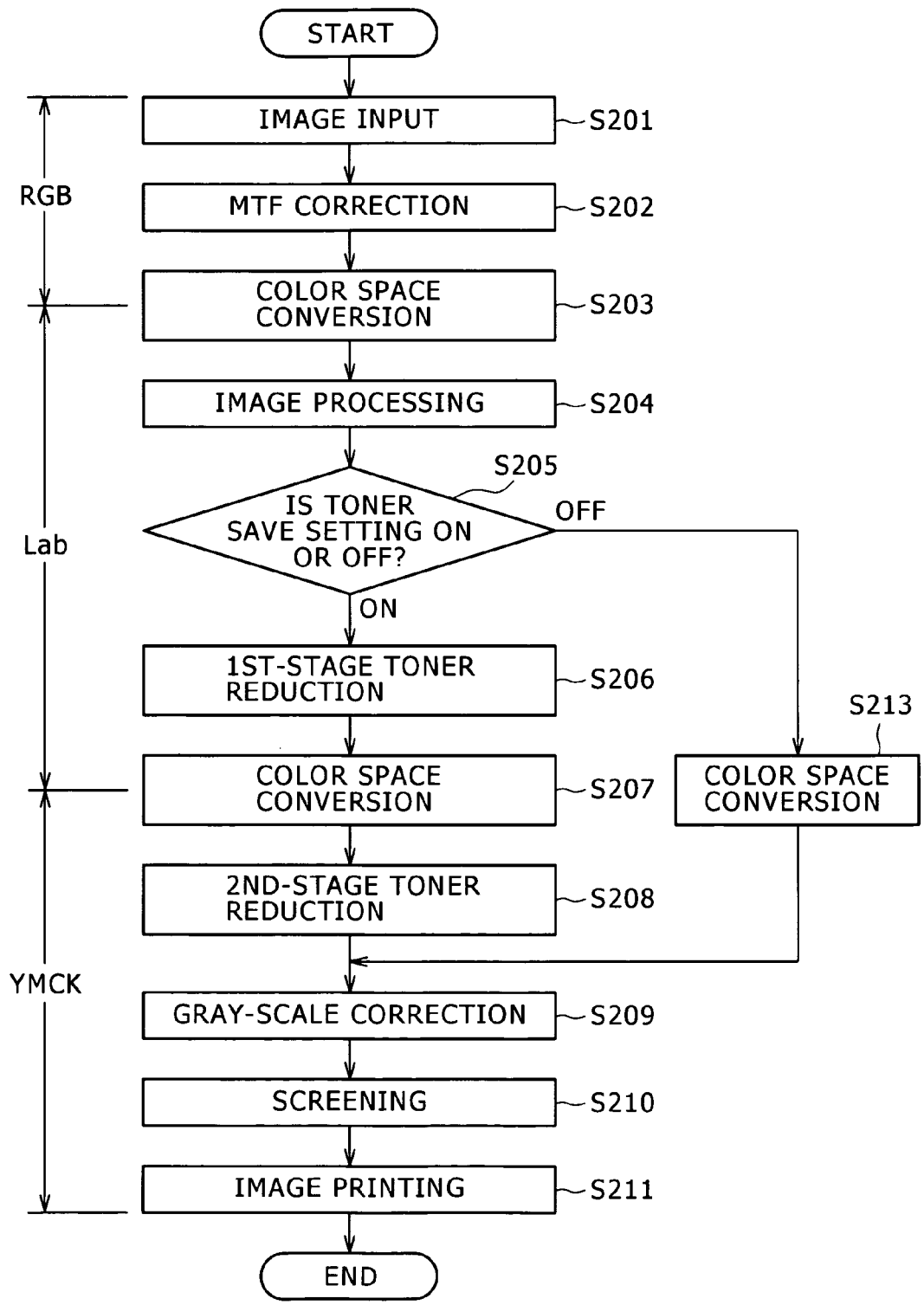
FIG. 7 is a flowchart illustrating a process flow that is performed by the image forming apparatus.

FIG. 7 is a flowchart illustrating a process flow that is performed by the image forming apparatus shown in FIG. 6. This flowchart describes the process flow in relation to the color spaces, as is the case for FIG. 2. First, the image input device 11 scans an image and the image represented in, for example, the RGB color space is input (step 201). The input image data is subjected to MTF correction which is made by, for example, the image input device 11, using, for example, an emphasizing filter (step 202). Then, the pre-stage color conversion unit 21 in the image processing device 15 executes color space conversion from the RGB color space to the YMCK color space data (step 203).

The image data converted into Lab signals in the uniform color space is processed by the image processing unit 22 for various purposes (step 204). Here, the image processing device 15 determines whether toner save setting is on or off, as specified via, for example, the UI screen (step 205). If the toner save setting is on, the pre-stage toner reduction unit 25 executes first-stage toner reduction (step 206). Then, the post-stage color conversion unit 23 executes color space conversion from the Lab color space to the YMCK color space which is output color space (step 207). The toner reduction unit 24 executes second-stage toner reduction in the same way as described in the first exemplary embodiment (208). Then, the YMCK image data is subjected to gray-scale correction (step 209) and screening (step 210), which are executed by, for example, the controller of the image output device 13. After these steps, the image output device 13 prints the image by, for example, electrophotographic printing using Y color, M color, C color, and K color toners (step 211), and the process terminates.

If the toner save setting is off at step 205, Lab to YMCK color space conversion in the same way as in step 207 is performed (step 213) without executing the first-stage toner reduction at step 206. Then, the process proceeds to step 209 and subsequent without executing the second-stage toner reduction at step 208.

In the process described in FIG. 7, the first-stage toner reduction is executed for the Lab signals in the uniform color space and, moreover, the second-stage toner reduction is executed in conjunction with the color conversion to YMCK.

Then, the first-stage toner reduction at step 206 that is executed by the pre-stage toner reduction unit 25 (see FIG. 6) is explained.

Figure 8:
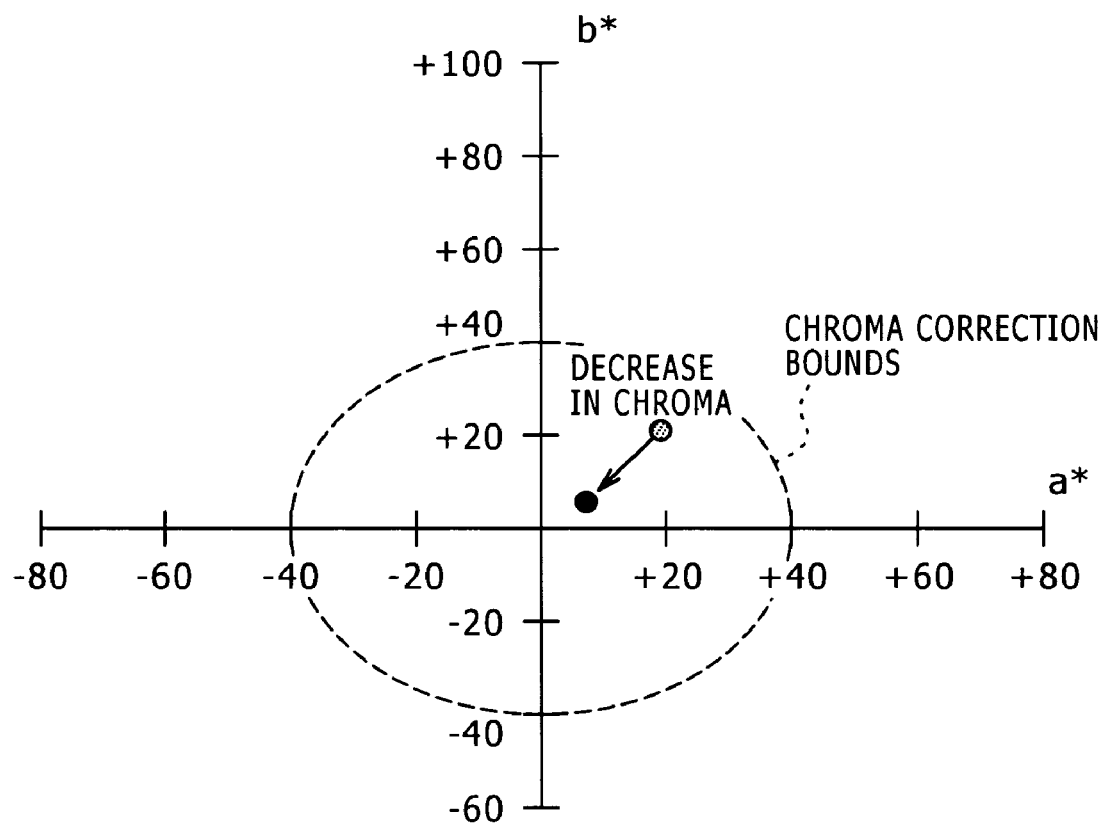
FIG. 8 is a graph to explain first-stage toner reduction.
Figure 9A:
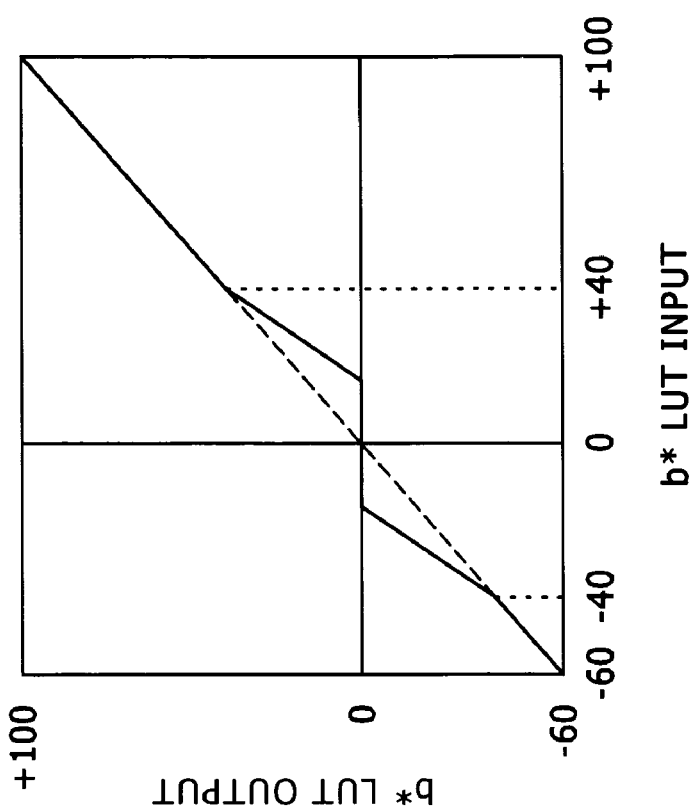
FIGS. 9A and 9B show formulations of a chroma correction LUT which is used by a pre-stage toner reduction unit.
Figure 9B:
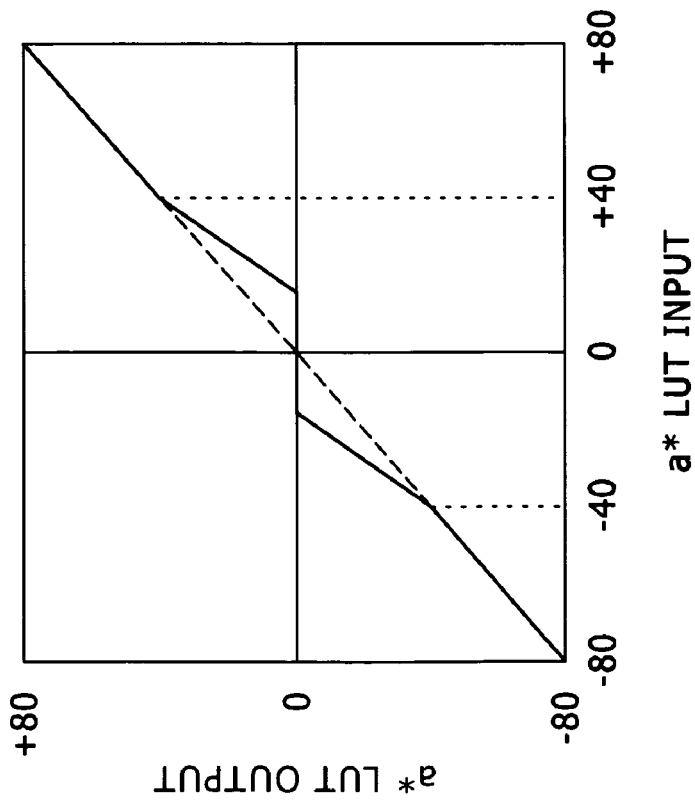

FIG. 8 and FIGS. 9A and 9B are graphs to explain the first-stage toner reduction. FIG. 8 shows an a*–b* graph with a* on the abscissa and b* on the ordinate, wherein chroma correction bounds are marked. In the present exemplary embodiment, chroma correction bounds are defined in the input Lab color space. In the example shown in FIG. 8, the chroma correction bounds (bounds at a predetermined level around the gray axis) are set at ±40 on both scales of a* and b*. That is, the chroma correction bounds are denoted by a dotted circle in FIG. 8. When the toner reduction is performed, a reduction in chroma takes place only within this correction bounds by reflecting the effect of a chroma correction LUT. Input chroma values are maintained outside the correction bounds. By this action, the chroma values of pixels in the vicinity of the gray axis are converted so as to become closer to the gray axis.

FIGS. 9A and 9B show formulations of the chroma correction LUT that is used by the pre-stage toner reduction unit 25. FIG. 9A shows a characteristic of a* LUT output in relation to a* LUT input to the chroma correction LUT, with a* LUT input values on the abscissa and a* LUT output values on the ordinate. FIG. 9B shows a characteristic of b* LUT output in relation to b* LUT input to the chroma correction LUT, with b* LUT input values on the abscissa and b* LUT output values on the ordinate. In both the graphs of FIGS. 9A and 9B, output values are truncated to 0 in the vicinity of an input value of 0. In the portion of input values lower than ±40, output values are made closer to 0 as compared with a normal characteristic line denoted by a dotted line.

The pre-stage toner reduction unit 25 executes such chroma correction in accordance with the chroma correction LUT for input pixels in the uniform color space. By the action of this chroma correction LUT, the chroma values of pixels in the vicinity of the gray axis become closer to the gray axis.

After that, the post-stage color conversion unit 23 and the toner reduction unit 24 execute the second-stage toner reduction in the same way as described in the first exemplary embodiment. That is, each of color components Y, M, C is trimmed in accordance with the LUT for cutting low density components. This LUT for cutting low density components has the characteristic of the conversion LUT shown in FIG. 4. By the action of this LUT, small amounts of color components remaining in the vicinity of the gray axis among the pixel values decomposed into Y, M, C, and K are cut or reduced. The trimming range in accordance with the LUT may be set within the chroma correction bounds specified for the first-stage toner reduction.

In the conversion to the YMCK color space which is executed in the next color conversion step, YMC colors are mixed in nearer to equal proportions for pixels closer to the gray axis and a larger number of process black components can be replaced with the K color component. As a result, the amounts of use of the toners as imaging materials can be reduced. Particularly, for the color toners, a considerable saving effect can be expected. That is, through this color conversion, a color which is produced by the colorants for N colors (where N is an integer of 2 or greater) can be converted into a color which is produced by the colorant(s) for at least one color or (N−1) colors. Thereby, the total amount of toner consumption can be reduced.

By adjusting the chroma correction bounds, the range of gray-scale values of pixels that should be made closer to the gray axis can set variably. For example, if the correction bounds are set narrower, color appearance can be maintained better, whereas the imaging materials can be saved to a smaller extent. If the correction bounds are set broader, the imaging materials can be saved to a greater extent, whereas color appearance can be maintained, but to a lower degree. For example, such correction bounds may be reconfigured by using the UI or the like as will be described later. For example, if a 5% reduction in the toners is desired, the correction bounds are set narrower to keep the image quality unchanged. If a 50% reduction in the toners is desired, the correction bounds are set broader to give priority to the degree of imaging material saving over maintaining color appearance.

Furthermore, it may be effective to reduce the imaging materials, while maintaining the imaging quality of characters, by referring to an image area separation signal. An image area separation signal, which is, for example, based on a well-known technique, may be referred to and the chroma correction operation may be set on/off for a text area and an illustration or picture area. For example, even if a toner saving mode is selected, a reduction in the colorants is not performed for a text area filled with black or color characters to maintain the imaging quality of the characters and the chroma correction operation is performed for an illustration or picture area. Such operation may be executed in combination with the second-stage toner reduction.

As discussed above, in the second exemplary embodiment, the chroma correction operation is performed for the Lab image data before the color conversion in accordance with DLUT (Direct-Look up Table) for conversion from Lab to YMCK. The chroma values of pixels positioned near to the gay color in the vicinity of the L axis are reduced and the YMC color components are made as near to equal proportions as possible. Moreover, the color conversion according to the DLUT is configured to convert all process black components in which the YMC colors are mixed in equal proportions to the K color component. This affects a subtle color appearance in the vicinity of the gray (L) axis, but in return, the imaging materials can be saved. A considerable reduction effect particularly in color toners can be expected.

Furthermore, by output correction for YMC image data after the DLUT color conversion as discussed in the first exemplary embodiment, trances of mixed colors can be cut within the chroma bounds around the L axis.

As discussed above, according to the first and second exemplary embodiments, it is possible to reduce the amount of use of imaging materials such as toners to a great extent, while restraining degradation of image quality, wherever possible.

Although a reduction in the toners as the imaging materials has been discussed by way of example in the foregoing first and second exemplary embodiments, the invention can be applied to other imaging materials such as inks.

Here, the UI that is used in the first and second exemplary embodiments is explained.

Figure 10:
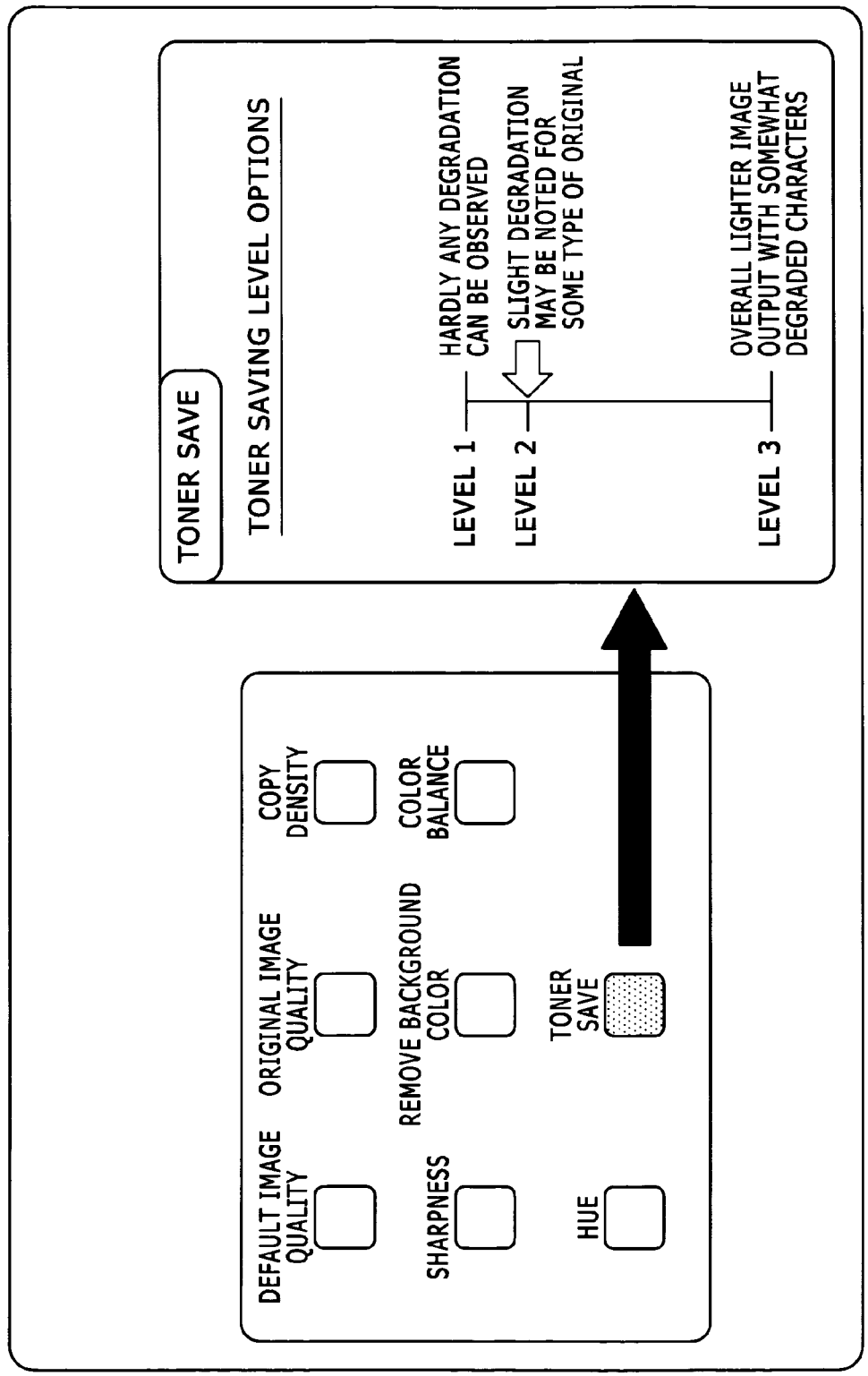
FIG. 10 illustrates an example of a UI screen allowing the user to select a toner saving mode.

FIG. 10 illustrates an example of the UI screen allowing the user to select a toner saving mode. In the toner saving mode setting screen shown in FIG. 10, when the user chooses a "toner save" button, a screen for selecting a toner saving level (at the right side in FIG. 10) is displayed. In the toner saving level selection screen, one of three toner saving levels can be selected. For example, level 1 produces an image in which hardly any degradation can be observed; level 2 produces an image in which slight degradation may be noted for some type of original; and level 3 produces an overall lighter image output with somewhat degraded characters.

If, for example, level 1 is selected, the "Start" and "End" points in the LUT, for example, as shown in FIG. 4, are shifted down to lower input gray-scale values. By thus adjusting the characteristic curve gradient (parameters) of the LUT to make variation to a smaller extent, the mount (level) of toner reduction is controlled to be lower. If level 2 is selected, the "chroma correction bounds" shown in FIG. 8 for the second exemplary embodiment are set at a lower value than ±40. In addition, image area separation is performed and toner saving is controlled so that the process of the second exemplary embodiment is not performed for a text area. If level 3 is selected, toner saving is controlled to increase the amount of toner reduction by making full use of the foregoing first and second exemplary embodiments. The described exemplary embodiments are illustrative. Toner reduction may be adjusted optionally and its adjustment amount can be determined, according to image quality required to be maintained and a reduction level of the total toner amount. Higher-performance color conversion can be realized by making a level-by-level adjustment of toner reduction in view of and for making full use of the properties (hue angle, density, etc.) of the imaging materials in use.

The present invention may be embodied in other specific forms without departing from its spirit or characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed is:

1. An image forming apparatus with a saving mode in which imaging materials to be used are reduced, comprising:
   an image processing part that converts image data from which an image will be formed into corresponding image data in an output color space; and
   an image forming part that foams the image from the image data converted by the image processing part, using the imaging materials; wherein
   the image processing part reduces a color component of non-dominant (n+m)-component color mixed into a dominant n-component color in the image data converted, where n and m are integers of 1 or greater; and
   the image processing part converts a process black component produced by the substantially equal amounts of YMC color components among all the YMC color components approaching to the substantially equal amounts to a K color component.

2. The image forming apparatus according to claim 1, further comprising an input part that inputs image data,
   wherein the image processing part comprises a first color conversion unit that converts the image data represented in an input color space, input by the input part, into corresponding image data in a uniform color space, and a second color conversion unit that converts the image data converted into the uniform color space into the corresponding image data in the output color space, wherein reduction of the color component is performed in conjunction with or after the conversion to the image data in the output color space by the second color conversion unit.

3. The image forming apparatus according to claim 1, further comprising a recognition part that recognizes that a saving mode is set to reduce the imaging materials to be used,
   wherein the image processing part performs the reduction of the color component when the recognition part recognizes that the saving mode is set, and
   the image foaming part reduces a total amount of the imaging materials to be used by the reduction of the color component performed by the image processing part.

4. The image forming apparatus according to claim 1, further comprising a saving mode setting part that allows a user to set the saving mode.

5. The image forming apparatus according to claim 4, wherein the saving mode setting part allows the user to set one of saving levels corresponding to different amounts of the imaging materials to be reduced, based on different levels of image degradation anticipated to occur by the different amounts of the imaging materials to be reduced.

6. The image forming apparatus according to claim 1, wherein the image processing part reduces chroma of pixels positioned within a predetermined area around a gray axis for image data, from which an image will be formed, to cause amounts of YMC color components in an output color space approach to substantially equal amounts.

7. An image forming apparatus comprising:
   a recognition part that recognizes that a saving mode is set to reduce imaging materials to be used;
   an image processing part that converts a color which is produced by colorants of N colors in image data, from which an image will be formed, into a color which is produced by colorants of from one color to (N-1) colors when the color recognition part recognizes that the saving mode is set, where N is an integer of 2 or greater; and
   an image forming part that forms an image from the image data converted by the image processing part; wherein
   the image processing part converts a process black component produced by the substantially equal amounts of YMC color components among all the YMC color components approaching to the substantially equal amounts to a K color component.

8. The image forming apparatus according to claim 7, wherein the image processing part reduces chroma of pixels positioned within a predetermined area around a gray axis for image data, from which an image will be formed, to cause amounts of YMC color components in an output color space approach to substantially equal amounts.

9. The image forming apparatus according to claim 7, wherein the image processing part reduces a color component of a non-dominant (n+m)-component color mixed with a dominant n-component color in the image data in which the chroma of the pixels have been reduced, where n and m are integers of 1 or greater.

10. The image forming apparatus according to claim 7, further comprising an image area separation part that separates an image area into a text area and a non-text area,
   wherein the image processing part does not perform a reduction in the colorants for an area recognized as the text area filled with black characters, color characters or combination thereof by the image area separation part, even when the recognition part has recognized that the saving mode setting is on.

11. An image processing method that makes a reduction in imaging materials to be used in a saving mode, comprising:
   inputting image data,
   reducing a color component of a non-dominant (n+m)-component color mixed with a dominant n-component color in the image data in conjunction with or after the conversion into corresponding image data in an output color space, where n and m are integers of 1 or greater;
   outputting the image data in the output color space in which the color component of the non-dominant (n+m)-component color has been reduced; and
   converting a process black component produced by substantially equal amounts of YMC color components to a K color component for the image data in which the chroma has been reduced in conjunction with or after the conversion to the output color space.

12. The image processing method according to claim 11, further including reducing chroma of pixels positioned within a predetermined area around a gray axis in the image data, before converting the input image data into the corresponding data in the output color space.

13. An image processing method that performs a reduction in imaging materials in a saving mode, comprising:
   reducing chroma of pixels positioned at a predetermined area around a gray axis in image data, before converting the image data from which an image will be formed into corresponding image data in an output color space;
   converting a process black component, produced by substantially equal amounts of YMC color components among all the YMC color components approaching to the substantially equal amounts by reducing the chroma values, to a K color component in conjunction with the color conversion to the output color space; and
   making output correction on YMCK image data after the color conversion to the image data in the output color space.

14. The image processing method according to claim 13, wherein the output correction reduces mixed colors within a predetermined chroma level around an L axis.

15. The image processing method according to claim 13, further including referring to an image area separation signal to determine an area where the reduction in the imaging materials is performed.

* * * * *